United States Patent [19]

Farrell

[11] Patent Number: 5,613,802

[45] Date of Patent: Mar. 25, 1997

[54] APPARATUS FOR DEPLOYING A WORK OBJECT

[75] Inventor: Michael M. Farrell, Kingsburg, Calif.

[73] Assignee: Nibco Inc., Elkhart, Ind.

[21] Appl. No.: 665,957

[22] Filed: Jun. 17, 1996

Related U.S. Application Data

[63] Continuation of Ser. No. 210,691, Mar. 17, 1994, abandoned.

[51] Int. Cl.$^6$ .................................................. E02B 13/00
[52] U.S. Cl. ................................................ 405/36; 405/41
[58] Field of Search ............................. 405/36, 41, 37, 405/43, 45, 50–52; 239/201–206

[56] References Cited

U.S. PATENT DOCUMENTS

| | | | |
|---|---|---|---|
| 1,121,618 | 12/1914 | Elder | 239/204 X |
| 1,612,135 | 12/1926 | Lorraine | 239/204 |
| 2,607,623 | 8/1952 | Lippert . | |
| 2,698,873 | 1/1955 | Allsworth et al. | 52/40 X |
| 3,002,696 | 10/1961 | Jenkins . | |
| 3,104,822 | 9/1963 | Muschett | 239/206 |
| 3,292,322 | 12/1966 | Pfaff et al. | 52/40 X |
| 3,752,403 | 8/1973 | Diest . | |
| 3,929,288 | 12/1975 | Brusadin et al. | 239/201 |
| 4,099,670 | 7/1978 | Cole et al. . | |
| 5,039,011 | 8/1991 | Parker | 239/205 X |
| 5,083,886 | 1/1992 | Whitman | 405/41 |
| 5,133,501 | 7/1992 | Marshall | 239/201 |

FOREIGN PATENT DOCUMENTS

2201718  7/1973  Germany .............................. 239/204

Primary Examiner—Dennis L. Taylor
Attorney, Agent, or Firm—Price, Heneveld, Cooper, DeWitt and Litton

[57] ABSTRACT

A method for deploying a work object, connected to a control system by an elongated, substantially flexible conduit, relative to a target, the method including the steps of substantially burying the work object in the earth in a predetermined position relative to the target with the conduit extending upwardly from the work object to the surface of the earth; extending the conduit to the control system substantially across the surface of the earth; and covering the portion of the conduit extending across the surface of the earth to conceal its presence. An apparatus for deploying a work object in an operational position, the apparatus having a housing adapted to be positioned beneath the operational position; a member mounted on the housing and adapted to mount the work object for movement to and from the operational position; and a system connected to the housing for moving the work object to and from the operational position.

9 Claims, 5 Drawing Sheets

APPARATUS FOR DEPLOYING A WORK OBJECT

SPECIFICATION

This is a continuation of application Ser. No. 08/210,691 filed on Mar. 17, 1994 now abandoned.

BACKGROUND OF THE INVENTION

1. Field of the Invention

The present invention relates to a method and apparatus for deploying a work object and, more particularly, to such a method and apparatus which are particularly well suited to the installation and operation of irrigation systems and the like.

2. Description of the Prior Art

The installation and operation of utility systems of various types present complex problems which may not initially be recognized. For example, the installation and operation of electric lighting systems, sprinkler systems, irrigation systems and other utility systems, particularly such as used in landscaping, present a multitude of difficulties not immediately apparent to people without firsthand experience.

Taking sprinkler and irrigation systems as an illustrative example, the installation of such systems requires careful planning, substantial expense for the required materials and inordinate physical labor in the installation thereof. Where such installation is performed by hired personnel, there is a concomitant expense for these services. While, in large part, metal conduit, risers, valves and sprinklers have been replaced by components manufactured from synthetic plastic materials, this evolution has not alleviated most of the problems associated with the installation of such systems. It is true that components fabricated from plastic are generally cheaper to manufacture, less expensive to the end user, easier to install and otherwise more trouble free than their metal counter parts. It is also true that the use of such plastic components eases the task of replacing broken or worn components, as well as that of modifying such systems once installed.

Nonetheless, the installation of sprinkler and irrigation systems, whether fabricated from metal or plastic, is a highly labor intensive process which has experienced little significant improvement. Typically, such systems, whether metal or plastic, are installed in accordance with the same method. A manifold valve system is assembled and connected to a source of water under pressure at a location relative to the landscaping which is both convenient and, preferably, centralized relative to the landscape area to be serviced by the system. The landscape area is then excavated to form an array of trenches extending throughout the area for the dispersion of water through the system and in accordance with the water requirements of the plant life to be grown therein. This array of trenches is formed either in a single step after which the system is installed therein, or in sequence such as by excavating a trench and then installing the portion of the irrigation system therewithin before proceeding to the next trench.

This excavation process is both tedious and otherwise onerous, even with the use of mechanized equipment. The trenches need to be deep enough that the conduit to be buried therein will not work itself free of the trench over time. There may be other utility systems such as gas lines, other water lines, or buried electrical systems which must be avoided. Similarly, the geological condition of the earth within the landscape area may not be conducive to such excavation. Any combination of rock formation may be present in the earth through which trenching is very difficult, if not impossible. Frequently layers of hard subsoil or clay known as "hardpan" or "caliche", may be present in the landscape area. Where such conditions are present, it may be necessary to soak the subsoil with water, perhaps with the assistance of a suitable penetrant, in order to dig the trenches, even with mechanized equipment. Existing trees, shrubs and other plant life may be supported by well developed root systems which intrude into the areas through which the trenches are to extend. Still further, there may also be virtually any type of waste materials buried in the paths of the trenches including such unpleasant discoveries as broken concrete, plumbing, wood, and the like, from pre-existing structures.

Once excavation of the trenches has been achieved, conventional practice calls for the plastic components of the irrigation system to be assembled using a suitable plastic adhesive and extending from the valve manifold to the individual locations at which the sprinklers, or other irrigation devices, are to be emplaced. This process is not itself particularly difficult, but suffers from several rather common difficulties. Particularly where mechanized equipment is used in forming the trenches, it is frequently the case that the trenches do not extend to precisely the positions or depths desired requiting that the trenches be modified to some degree for proper placement of the irrigation devices. The adhesive used in interconnecting the plastic components has a tendency to leak or be forced into the interior of the conduits and, upon pressurization of the system, to be pulled free to be carried along the system resulting in the obstruction of lines and irrigation devices. Such obstructions may be evident when an irrigation device does not operate properly, or when fluid pressure along a conduit is insufficient. However, location of the obstruction may be very difficult where the obstruction is not within the irrigation device itself. This may require that the conduit be replaced. Where the obstruction is within the irrigation device, it may be very difficult or impossible to remove the adhesive from small fluid passages or the orifice thereof. Furthermore, the hardened adhesive may not pull free until a considerable period of time after installation of the system so that the existence of an obstruction does not become apparent until plant life watered by the irrigation device languishes. Compounding these problems is the all too human tendency of those responsible for such installations simply to ignore these problems resulting in an irrigation system which is defective to one degree or another.

Once an irrigation system has been installed, there is a continuing need for maintenance in order to ensure that the system function properly. Conduits and irrigation devices may become obstructed through a long period of use due to a wide variety of causes. Portions of the irrigation system may need to be repositioned, extended, shortened, replaced, or otherwise modified in order satisfactorily to irrigate plant life in the landscaped area. Irrigation devices may be damaged or broken off by passersby, lawn mowers and the like. Similarly, portions of the conduit may inadvertently be punctured, fractured or may otherwise require replacement. Where these needs arise, all of the problems associated with installation previously cataloged are again presented.

Still another circumstance inherent in conventional sprinkler and irrigation systems and methods for their installation is the need to have the irrigation devices and, depending upon the type, the risers thereof, exposed to view throughout the landscape area. Those irrigation devices which are operable to water larger plants are typically permanently mounted on elevated risers. Furthermore, certain plants such as ferns, require the foliage to be topically sprayed in addition to irrigation of the root zone. These facts result in two primary problems. A first problem is that the presence of such equipment detracts from the overall aesthetic appearance of the landscaping. While landscape plans frequently attempt to take into account such considerations by placing sprinklers behind plants, to the extent possible, so as to disguise their presence, the utilitarian need to irrigate the plant life requires a degree of exposure. Secondly, the exposure of such irrigation equipment virtually ensures that it will be damaged over time due to impact by passersby and by equipment, such as lawn mowers. Thus, those responsible for continued operation of the irrigation system must be observant for such damage and must make the repairs on those occasions as required to keep the system in operation. Such maintenance is a more or less continuous problem for those responsible.

The use of plastics in the manufacture of such components increases the risk of such damage as compared with metal components. However, the use of metal risers and metal sprinklers on systems which are otherwise plastic, is not necessarily more resistant to damage. For example, the metal risers are not themselves flexible and so any impact applied thereto is transferred to the plastic conduit beneath, resulting frequently in the buried conduit being fractured and requiring, perhaps, even more effort to repair the damage.

Therefore, it has long been known that it would be desirable to have a method and apparatus for deploying a work object which is particularly well suited to usage in the installation and operation of such utility systems as subsurface electrical systems, sprinkler systems and other irrigation systems; which permits such utility systems to be installed rapidly, dependably, and at a cost significantly below that which is heretofore been possible; which can readily be modified or otherwise adjusted with little or no difficulty particularly when compared with conventional methods and apparatuses; which require significantly less labor in the installation process than has heretofore been possible; which, once installed, is essentially invisible when not in operation; which, upon operation, deploy the operable portions thereof in the optimum positions; which can readily be adjusted to accommodate growth in plant life over a long operational life; and which otherwise are entirely successful in accomplishing their operational objectives.

SUMMARY OF THE INVENTION

Therefore, it is an object of the present invention to provide an improved method and apparatus for deploying a work object.

Another object is to provide such a method and apparatus which permit utility systems, such as electrical systems, sprinkler systems and other irrigation systems, to be installed more rapidly, conveniently and at significantly less expense than has heretofore been possible with any conventional systems.

Another object is to provide such a method and apparatus which permit such utility systems to be installed in the earth, such as in landscaping, without excavation to form trenches as heretofore required in all conventional systems.

Another object is to provide such a method and apparatus which, when the apparatus is in a nonoperational mode, is entirely concealed from view so as not to detract from the aesthetic appeal of the landscaped or other area which it serves.

Another object is to provide such an apparatus which can readily be adjusted, or otherwise modified, throughout its operational life without the problems associated with conventional systems and yet which can be employed to position the operative portions thereof in precisely the individual positions desired.

Another object is to provide such an apparatus which inherently protects the operative portions thereof from both intentional and inadvertent damage.

Another object is to provide such a method and apparatus which are adaptable for use in deploying virtually any work object, but which has particular utility where the work object forms an operable part of a utility system, such as an electrical system, sprinkler system or other irrigation system.

Another object is to provide such a method and apparatus which obviate the need for extensive, labor intensive installation procedures which characterize conventional methods and apparatuses.

Another object is to provide such a method and apparatus which, when employed in the operation of a sprinkler or irrigation system, permit rapid and dependable adjustment of the operative portions thereof to accommodate natural growth in the plant life irrigated thereby.

Another object is to provide such a method and apparatus which are fully adaptable to usage in virtually all types of irrigation systems and with respect to virtually all types of irrigation heads including sprinklers, low volume irrigation devices, microirrigation devices, and the like of any spray pattern and for virtually any range and including spray heads, bubblers, drip emitters, and the like.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the present invention in a method for deploying a work object, connected to a control system by an elongated flexible conduit, relative to a target including the steps of substantially burying the work object in the earth in a predetermined position relative to the target with the conduit extending upwardly from the work object to the surface of the earth; and extending the conduit to the control system substantially across the surface of the earth; and in an apparatus for deploying the work object in an operational position, the apparatus including a housing adapted to be positioned relative to an operational position; a member mounted on the housing adapted to mount the work object for movement to and from the operational position; and means connected to the housing for moving the work object to and from the operational position.

DESCRIPTION OF THE PREFERRED EMBODIMENT

Figure 1:
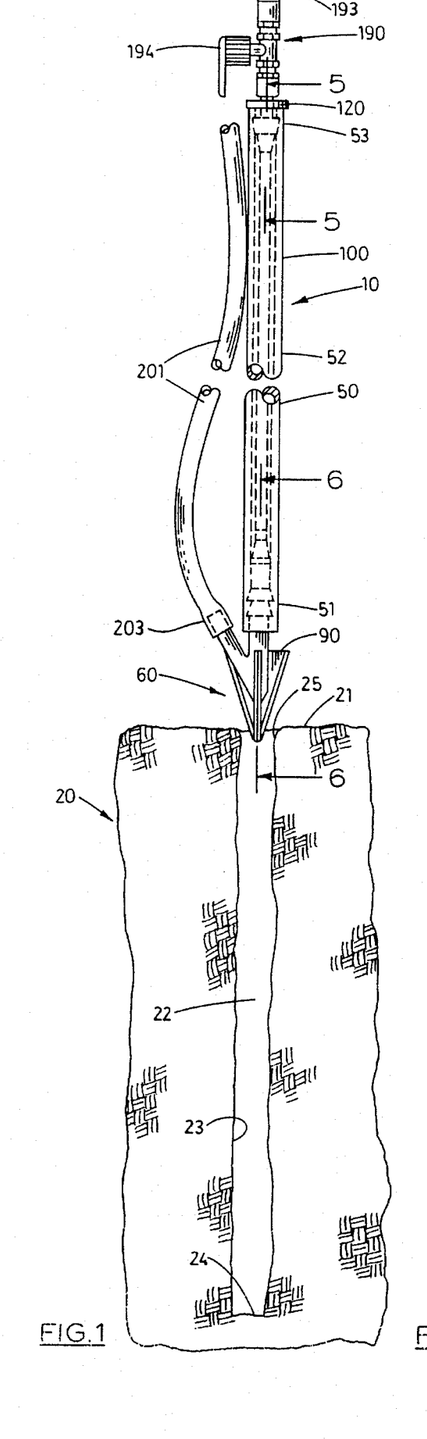
FIG. 1 is a fragmentary side elevation of the apparatus of the preferred embodiment of the present invention shown at the time of installation of the apparatus in a typical operative environment in accordance with the method of the present invention.

The apparatus of the present invention, operable in the practice of the method hereof, is generally indicated by the numeral 10 in FIG. 1. As will hereinafter become more clearly apparent, the apparatus is operable in a variety of environments, but is particularly useful in utility systems of various types, such as electrical systems, sprinkler systems, irrigation systems and the like. In the illustrative embodiment, the apparatus is an irrigation apparatus and, more particularly, such an apparatus employed in what is known in the industry as "microirrigation." Microirrigation systems are operable to release relatively low volumes of water over relatively small areas. In this respect, microirrigation systems distribute relatively more water in a given period of time than do drip irrigation systems, but substantially less water than distributed by full size, conventional sprinkler systems. As such, they are advantageous in the irrigation of plant life where drip irrigation is not entirely satisfactory, such as where the plant life requires topical spraying or misting which cannot be provided by drip irrigation systems. Yet, the conservation of water achieved in the use of such microirrigation systems is substantial in that there is little or no runoff or over watering associated with their usage. Such microirrigation systems are also advantageous for usage where the spray must be confined to a relatively limited area, such as small planted areas and planted areas inside homes, buildings, and the like.

Nonetheless, as previously noted, the method and apparatus of the present invention are widely adaptable for usage on all types of utility systems including both full size sprinkler systems, microirrigation systems, drip irrigation systems, electrical systems such as employed in outdoor lighting, and the like.

In the illustrative embodiment, the irrigation apparatus 10 is shown in the drawings as employed, for example, in a landscaped, outdoor area. In the drawings, the earth is indicated by the numeral 20 and the earth surface at 21. As shown in FIG. 1, a borehole 22 is formed in the earth defined by an interior surface 23 and extending along a substantially vertical path to a bottom 24. The borehole has an opening or mouth 25 at the surface of the earth. The borehole is shown simply for illustrative convenience and is not essential to the installation of the irrigation apparatus depending upon the subsurface condition of the earth, the length of the particular irrigation apparatus to be installed and the preferences of the person making the installation. More commonly, no borehole is formed but rather the loose soil is simply removed using a trowel or the like, the irrigation apparatus positioned in a vertical attitude in the resulting cavity and the loose soil subsequently simply compacted about the apparatus to retain it in the installed position.

Figure 3:
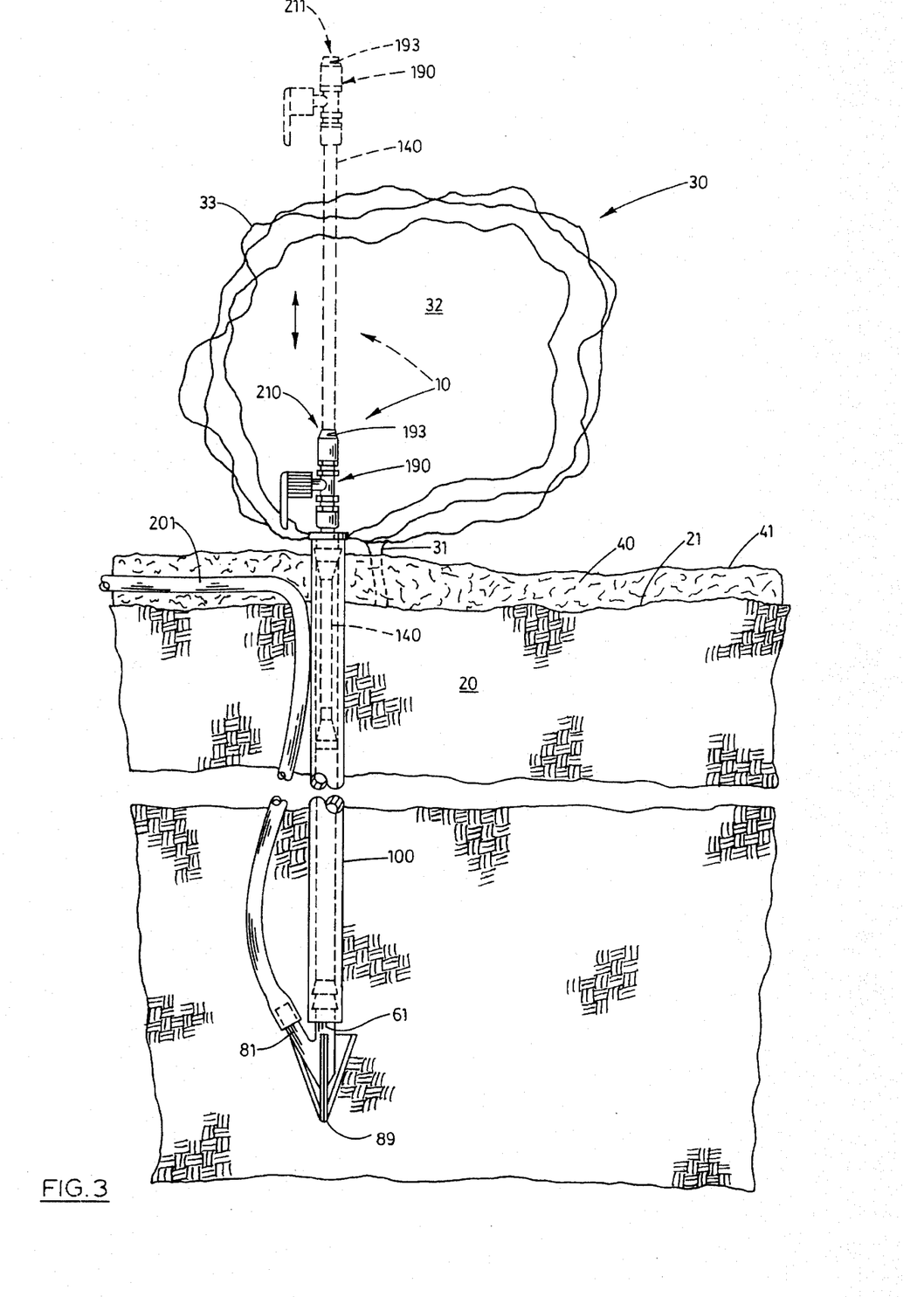
FIG. 3 is a fragmentary side elevation of the apparatus shown in a second installed position in the earth with a work object thereof shown in full lines in a retracted position and in phantom lines in an elevated deployed or advanced position.

As shown in FIG. 3, the irrigation apparatus 10 is in a preferred installed position relative to a plant 30 growing in the earth 20. The plant may be visualized as a shrub having a trunk 31 bearing overhanging foliage 32 having an outer perimeter or surface 33.

As also shown in FIG. 3, for illustrative convenience, a layer of a suitable surface treatment such as mulch is generally indicated by the numeral 40 and can be visualized as having an upper surface 41. The purpose served by the mulch will subsequently be discussed in greater detail.

Turning then to the irrigation apparatus 10, it has a main body 50. The main body has a lower portion 51, a central portion 52 and an upper portion 53, as shown in FIG. 1.

The main body 50 has a base member 60. The base member is, perhaps, best shown in FIG. 6 and has a cylindrical tubular body 61 formed from the cylindrical side wall 62. The side wall has a cylindrical portion 63 which terminates in a substantially conical portion 64. The side wall encloses an internal chamber or passage 65 bounded by an interior surface 66 of the side wall. The passage 65 communicates with the exterior of the base member through a mouth or opening 67. The cylindrical portion 63 of the side wall is circumscribed by a pair of ribs or ridges 68. The tubular body 61 defines an axis of reference 70 extending longitudinally therethrough, as shown in FIG. 6.

Figure 6:
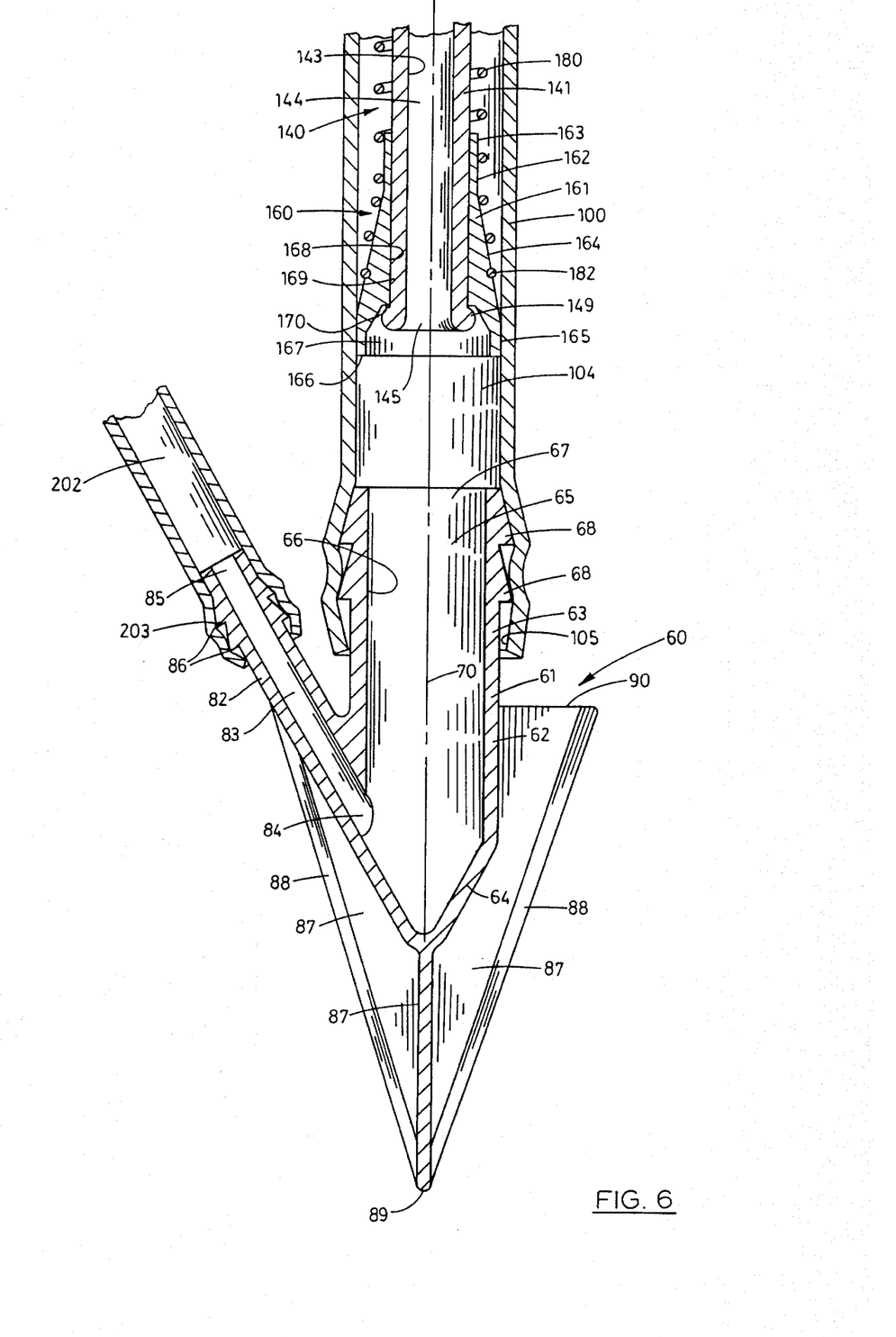
FIG. 6 is a somewhat enlarged, fragmentary, longitudinal vertical section taken on line 6—6 in FIG. 1.
Figure 7:
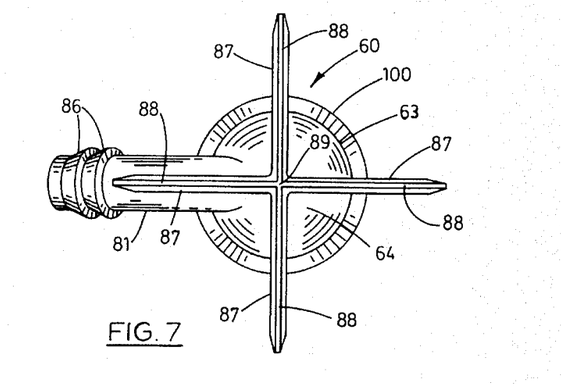
FIG. 7 is a bottom plan view of the apparatus.

The base member 60 mounts a lateral conduit 81 coextensive with the tubular body 61 of the base member and disposed at an acute angle relative to the axis of reference 70, as shown in FIG. 6. The lateral conduit has a cylindrical tubular side wall 82 bounding a passage 83 which communicates with the passage 65 of tubular body 61 through an opening 84. At the opposite end of the passage 83 the passage communicates with the exterior thereof through a mouth 85. The side wall 82 is circumscribed by a pair of ribs or ridges 86.

Figure 4:
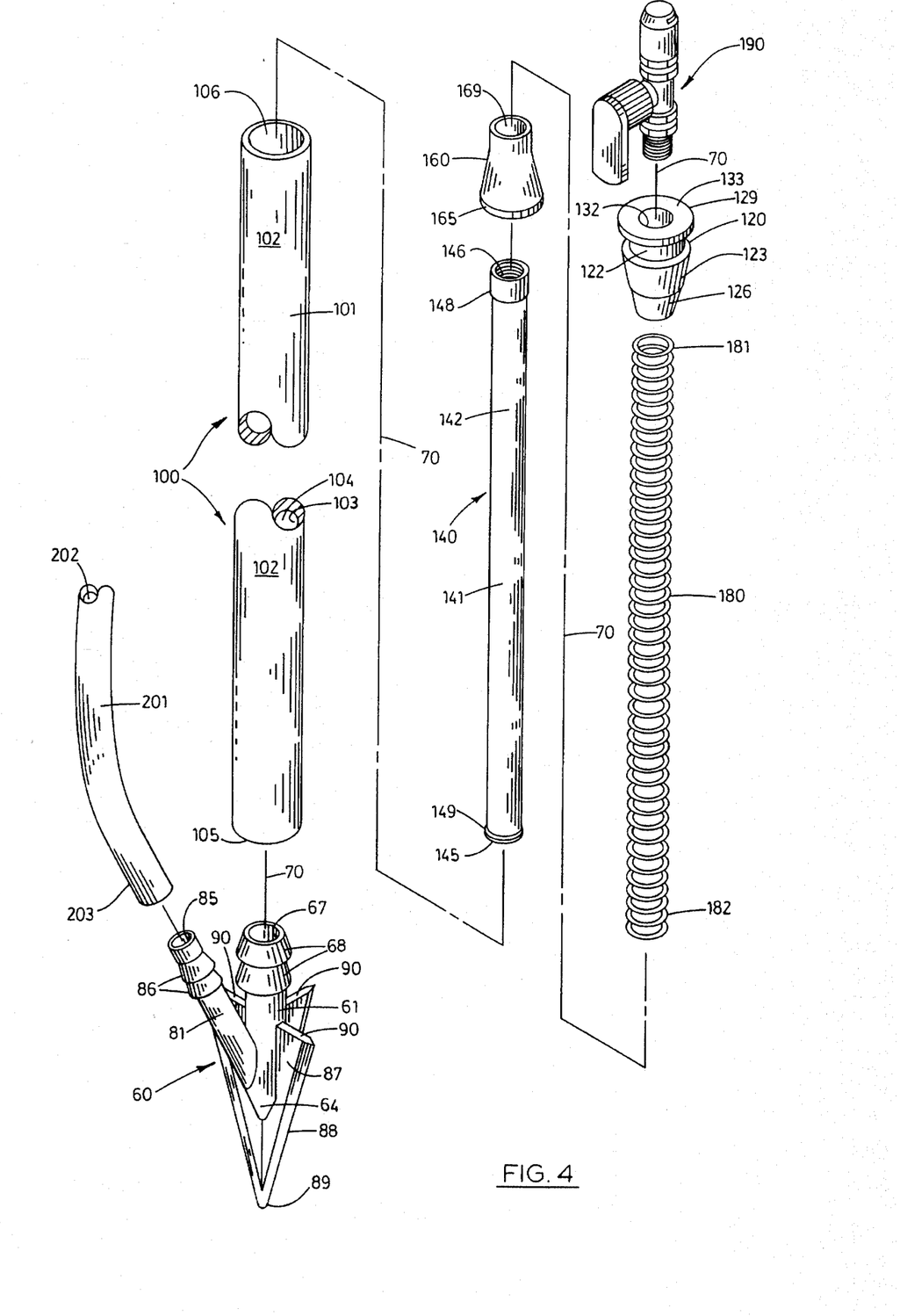
FIG. 4 is a somewhat enlarged, fragmentary exploded view of the apparatus of the present invention.

The base member 60 mounts four blades 87 which join the tubular body 61 and lateral conduit 81 individually defining planes of reference which intersect at the axis of reference 70. Adjoining blades 87 are right-angularly related to each other and have sharpened edges 88 which taper downwardly from the tubular body 61 to an apex 89. One of the blades extends downwardly from the lateral conduit 81. With the exception of the blade 87 extending downwardly from the lateral conduit, the remaining three blades have trailing edges 90 which are right-angularly related to the axis of reference 70 and define a plane of reference right-angularly related to the axis of reference 70. The trailing edges 90 are preferably of a flat or blunt configuration as may be visualized in FIG. 4.

The main body 50 has a main body member 100 having a cylindrical side wall 101 with a cylindrical exterior surface 102 and a cylindrical interior surface 103. The interior surface bounds a cylindrical internal passage 104 extending the full length of the main body member and communicating to the exterior thereof through a lower opening 105 and, at the opposite end, an upper opening 106. The preferred specific length of the main body member is dependent in part upon its desired position of installation and the height of the plant or plants which it is to be employed to spray. However, for purposes of illustrative convenience, the main body member can be visualized in the drawings as being approximately eight (8) to twelve (12) inches in length and having an outside diameter of approximately one-half (½) inch. The main body member is preferably constructed of conventional plastic irrigation tubing. Such tubing is conventionally employed, for example, as subsurface irrigation conduit in drip and microirrigation systems. Such tubing is flexible, but possesses sufficient rigidity so as to retain a substantially straight configuration, particularly when used in lengths of up to, for example, twenty (20) inches.

Figure 5:
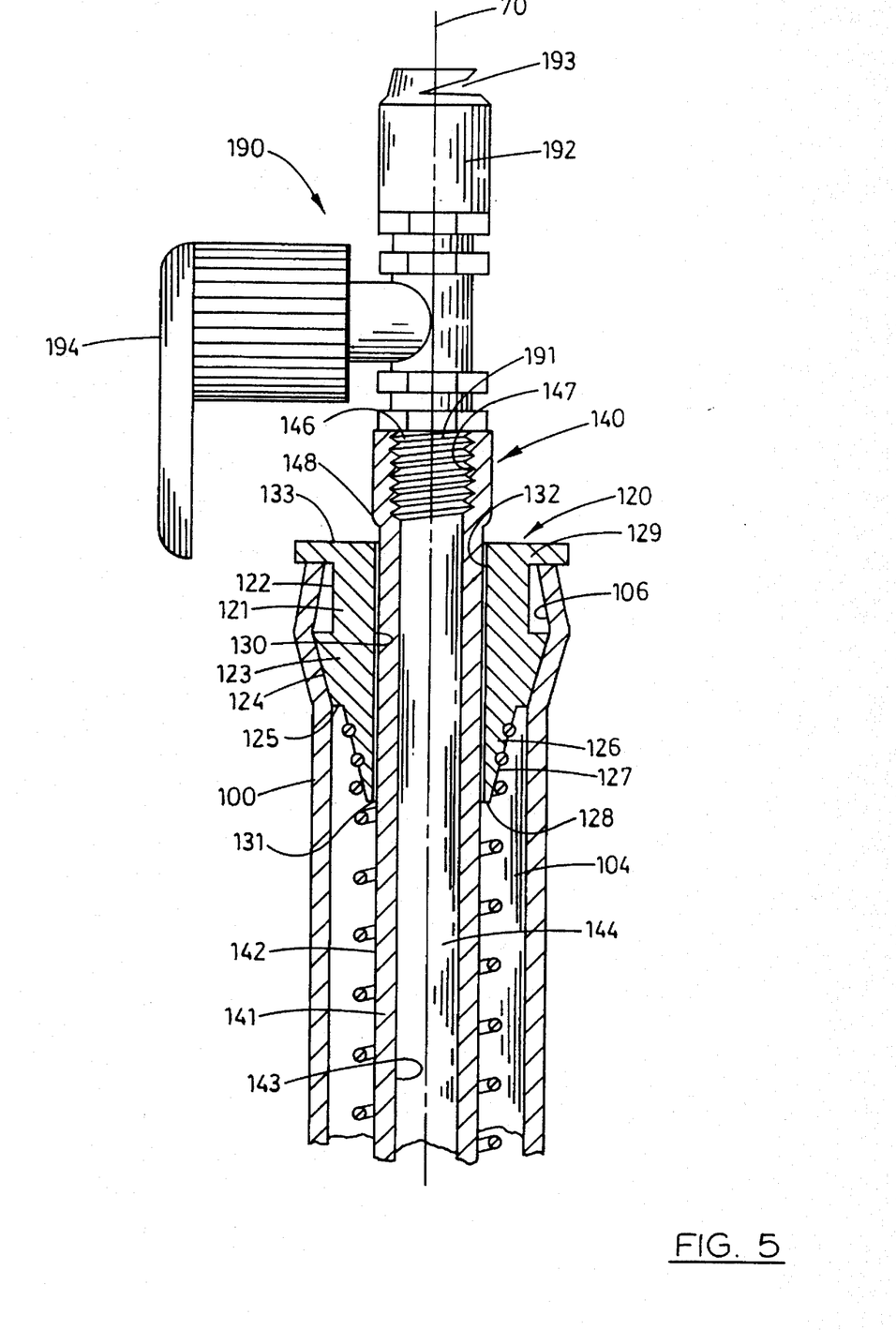
FIG. 5 is a somewhat further enlarged, fragmentary, longitudinal vertical section taken on line 5—5 in FIG. 1.

A guide member 120 is mounted in the upper opening 106 of the main body member 100, as best shown in FIG. 5. The guide member is preferably constructed of ridged plastic and has a body 121. The body has a cylindrical outer surface 122 which extends downwardly to an annular shoulder 123. The annular shoulder has a frusto-conical outer surface 124 which extends outwardly from the cylindrical outer surface 122 of the body and downwardly in converging relation terminating in a recessed annulus 125 defining a plane right-angularly related to the axis of reference 70, as shown in FIG. 5. Extending downwardly from the recessed annulus is a spring mounting portion 126. The spring mounting portion has a frusto-conical outer surface 127 tapering downwardly to an annular terminus 128 defining a plane right-angularly related to the axis of reference 70 and concentric thereto. At the opposite end of the body, a radial lip 129 extends outwardly from the cylindrical outer surface 122. A cylindrical passage 130 extends axially through the body 121 concentric to the axis of reference 70 and communicating externally thereof through a circular lower opening 131 and at its opposite end through a circular upper opening 132. The radial lip 129 has an upper surface 133 defining a plane right-angularly related to the axis of reference 70.

A riser assembly 140 is received for reciprocal movement within the main body member 100 slidably extending through the cylindrical passage 130 of the guide member 120. The riser assembly includes a cylindrical tubular body 141 i.e. tubular member having a cylindrical exterior surface 142. The tubular body has a cylindrical interior surface 143 bounding a cylindrical fluid passage 144. The fluid passage 144 communicates externally of the tubular body through a circular lower opening 145 and, at the opposite end thereof, through a circular upper opening 146. The tubular body 141 is preferably, although not necessarily, constructed of a smaller diameter irrigation tubing which is flexible but which is sufficiently rigid to maintain a substantially straight configuration, particularly when formed in lengths of, for example, up to twenty (20) inches. Conventional irrigation tubing is excellently suited to the purpose. For illustrative convenience, it may be visualized that the tubular body 141 is approximately six (6) to eight (8) inches in length and is approximately a quarter (¼) of an inch in outer diameter.

The tubular body 141 has internal screw threads 147 extending inwardly of the upper opening 146. The tubular body has an annular shoulder 148 spaced just a short distance downwardly from the upper opening 146. The annular shoulder can, as desired, be molded in the tubing, or result from expansion of the tubing by screw threaded installation therewithin of another component of the irrigation apparatus 10, as will hereinafter be described in greater detail. The tubular body has an annular shoulder 149 at the opposite or lower end thereof bounding the lower opening 145, as best shown in FIG. 6.

As also shown best in FIG. 6, a sealing assembly 160 is mounted on the lower end portion of the tubular body 141 within the internal passage 104 of the main body member 100. The sealing assembly has a body 161 preferably constructed of a resilient plastic material. The body 161 has an exterior surface 162 which is concentric to the axis of reference 70 and includes an upper cylindrical portion 163 which leads downwardly into an outwardly and downwardly tapering frusto-conical portion 164 leading to a cylindrical sealing surface 165. The sealing surface 165 slidably and sealingly engages the interior surface 103 of the main body member 100. The sealing surface leads to a lower annulus 166 concentric to the axis of reference 70 and bounds a lower chamber 167 extending inwardly of the body therefrom. The body 161 has a cylindrical internal surface 168 bounding a cylindrical internal passage 169 extending entirely through the body concentric to the axis of reference 70 and communicating with the lower chamber 167 thereof through an annular shoulder seat 170. The sealing assembly is slidably received on the exterior surface 142 of the tubular body 141 in fixed position with the annular shoulder seat 170 in facing engagement with the annular shoulder 149 of the tubular body, as best shown in FIG. 6. Thus, the sealing assembly 160 is movable with the tubular body 141 within the internal passage 104 of the main body member 100 with the sealing surface 165 thereof forming a substantially fluid tight seal with the interior surface 103 of the main body member 100.

A compression spring 180 is extended about the tubular body 141 of the riser assembly 140 within the internal passage 104 of the main body member 100. The compression spring has upper mounting coils 181 which are mounted on the spring mounting portion 126 of the guide member 120, preferably by a pressure fit of the upper mounting coils about the frusto-conical outer surface 127 of the spring mounting portion 126. The compression spring has lower mounting coils 182 mounted on the frusto-conical portion 164 of the exterior surface 162 of the body 161, as best shown in FIG. 6. The lower mounting coils also are preferably mounted on the frusto-conical portion by a pressure fit.

Referring more particularly to FIG. 5, a conventional microirrigation sprinkler 190 is mounted on the riser assembly 140 for movement therewith. As previously noted, the apparatus 10 of the present invention can be employed in virtually any type of utility system. Where the utility system is, more specifically, for irrigation, virtually any type of fluid release device can be employed. The microirrigation sprinkler 190 is simply shown in the drawings for illustrative convenience. The microirrigation sprinkler has an externally screw threaded mounting portion 191 which is screw-threadably received in the internal screw threads 147 of the tubular body 141. The microirrigation sprinkler has a nozzle 192 having a discharge orifice 193. The microirrigation sprinkler has a volume control assembly 194 of a conventional type.

Figure 2:
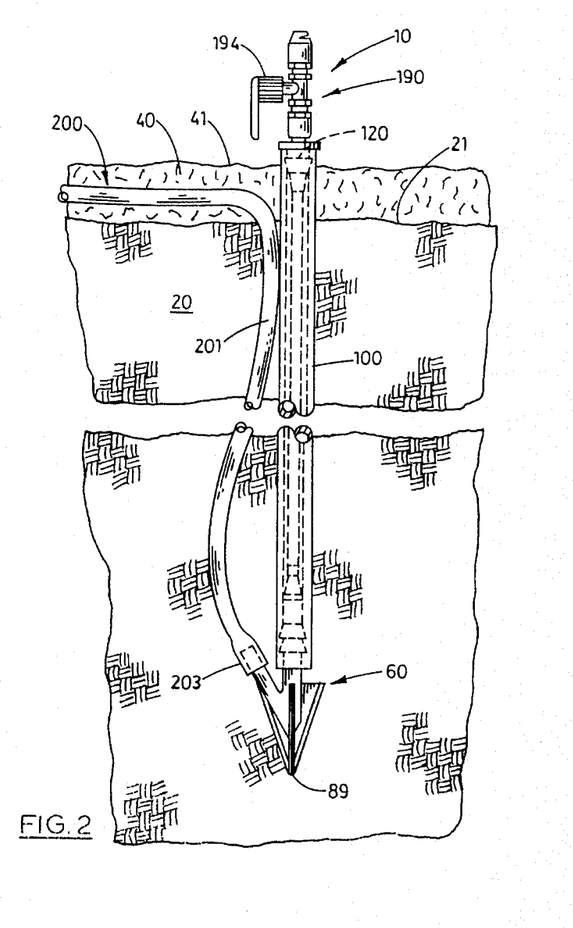
FIG. 2 is a fragmentary side elevation of the apparatus shown in an installed position in the earth.

The irrigation apparatus 10 forms an operable part of a fluid, or water system generally indicated by the numeral 200 in FIG. 2. The fluid system includes a flexible fluid conduit 201 having an internal passage 202. The fluid conduit has an attachment portion 203 which is slidably received on the lateral conduit 81 extending about the ridges 86 securely to retain the fluid conduit in the position described in fluid tight relation. Thus, the internal passage 202 of the fluid conduit communicates with the passage 83 of the lateral conduit. Fluid communication is thereby established from a source of water under pressure, not shown, along the internal passage 202, through the passage 83 of the lateral conduit, through the opening 84 and into the internal passage 65 of the base member 60 and upwardly into the internal passage 104 of the main body member. Thus, fluid communication is established with the lower chamber 167 of the sealing assembly 160 and upwardly through the fluid passage 144 of the riser assembly 140, through the upper opening 146 of the riser assembly and into the microirrigation sprinkler 190 for release through the discharge opening 193 of the nozzle 192 thereof. It will be understood that the fluid system 200 and, more particularly, the fluid conduit 201 are connected to the source of water under pressure, such as a valve manifold commonly employed for sprinkler systems. Such a valve manifold can manually, and/or automatically, be operated to release water under pressure along the fluid conduit 201 to the microirrigation sprinkler 190 as desired by the operator.

As will subsequently be discussed in greater detail, the riser assembly 140 and the microirrigation sprinkler 190 are movable by such operation of the fluid system between the retracted attitude or position 210 shown in full lines in FIG. 3 and the deployed or advanced attitude or position 211 shown in phantom lines therein.

OPERATION

The operation of the described embodiment of the subject invention and the practice of the method hereof are believed to be readily apparent and are briefly summarized at this point.

It may be of assistance to visualize the method of the present invention as involving the installation of a plurality of the irrigation apparatuses 10 within a landscaped area already having a variety and great number of plants planted and growing therewithin. Thus, the installation of the irrigation apparatuses comprising the system to be installed is designed to suit the irrigation needs of the plant life within the proscribed area. The irrigation apparatuses 10 and the plant 30 shown in the drawings are merely representative of a plurality of such irrigation apparatuses and plants within the landscaped area. It may also be of assistance to visualize that the earth 20, or more precisely, the soil within the landscaped area, has had soil amendments worked into the soil in accordance with conventional landscaping practices so that the soil is loose and easily worked.

However, one of the advantages of the method and apparatus of the present invention is that it is entirely possible to install the irrigation apparatuses 10 in an area where the soil is quite hard. This is because the irrigation apparatuses are each preferably installed as shown in FIG. 3 immediately adjacent to the trunk 31 of the plant 30 and thus within the well formed in the earth 20 during planting of the plant 30 therewithin. Thus, for example, when plant 30 is planted in an area where the soil is hard or highly compacted, it is necessary to excavate a hole within the earth of a sufficient diameter and depth to receive the root ball of the plant. Typically where a plant is properly planted, the area of the hole so formed is twice that of the root ball. Similarly, the hole is filled with the desired mixture of soil, mulch, other soil amendments about the root ball of the plant and within the hole so formed so that proper drainage for the plant is provided and so that the roots of the plant have room to grow in support of the plant. The irrigation apparatus 10 is preferably installed in this mixture within the hole immediately adjacent to the trunk 31, as will hereinafter be described. As a consequence, the hardened, or highly compacted soil outwardly of the hole does not in any way interfere with the installation of the irrigation apparatus.

Conversely, if desired, and with or without working of the soil of the earth 20, a borehole 22 can be formed in the earth extending from the surface of the earth 21 to the bottom 24 of the borehole for purposes of installing the irrigation apparatus. More commonly, where the soil of the earth has been worked, the irrigation apparatus can be installed with or without formation of the borehole. Where no borehole is formed, the soil is simply readily removed from the position at which the irrigation apparatus is to be installed using a trowel, shovel, or the like, so as to form a well within which the irrigation apparatus can be positioned. Subsequently, the loose soil is simply compacted about the irrigation apparatus to mount it in an upright, vertical position, such as shown in FIG. 2, with the soil compacted thereabout.

Where the earth is hard and a borehole 22 has been formed therein as shown in FIG. 1, the irrigation apparatus can be installed by forcing the base member 60 downwardly in the borehole until the apex 89 reaches the bottom 24 of the borehole or, until the upper portion 53 of the main body 50 of the irrigation apparatus reaches the desired height above the surface 21 of the earth 20. During such movement in the case of the borehole 20, the blades 67 and, more particularly, the sharpened edges 88 thereof, assist in guiding the downward movement of the irrigation apparatus and in centering in the apparatus in the borehole so that in an installed position, the axis of reference 70 is substantially vertical.

In any case and no matter how installed through the various methods heretofore described, once installed, the blades 87 assist in retaining the irrigation apparatus in the installed upright position. The blades similarly assist in preventing inadvertent or unwanted removal of the irrigation apparatus from the installed position. This is achieved in that the trailing edges 90 of the blades are deposed at right angles to the axis of reference 70 and are blunt so as to resist upward movement of the irrigation apparatus, much in the manner of an arrowhead.

As previously noted, preferably, each irrigation apparatus 10 is installed in the position shown in full lines in FIG. 3. In this installed position, the upper portion 53 of the main body 50 is a short distance above the earth's surface 21, immediately adjacent to the trunk 31 of the plant 30 and with the microirrigation sprinkler 190 concealed within the foliage 32 of the plant 30. Thus, as may be visualized in FIG. 3, the only portion of the irrigation apparatus which is above the earth's surface 21 is fully enclosed in, and concealed by, the foliage of the plant and is within the outer surface 33 of the foliage. In this installed position, the elevation of the irrigation apparatus, or more particularly, the upper portion 53 of the main body 50 is selected depending upon the distance of travel of the microirrigation sprinkler on the riser assembly 140 between the retracted attitude 210 shown in FIG. 3 and the deployed attitude 211 shown in phantom lines in FIG. 3. The deployed attitude 211 is above the upper surface of the foliage of the plant while the position in the retracted attitude is within the foliage of the plant.

In all instances, unless otherwise desired, the irrigation apparatus 10 is installed with the fluid conduit 201 extending upwardly along the main body member 100 from the lateral conduit 81 and from the earth 20 to a position above the surface 21 of the earth. The fluid conduit is extended from the irrigation apparatus along the surface of the earth, as shown in the views hereof, to its connection with the source of water under pressure, not shown. It can be visualized that all of the irrigation apparatuses 10 comprising the system installed in the landscaped area to be irrigated extend across the surface of the earth and are not housed within trenches as in the case of conventional irrigation systems. Thus, in accordance with the method and apparatus of the present invention, no trenches are formed in the earth and all of the fluid conduits extend across the surface of the earth. For aesthetic purposes, the fluid conduits comprising the fluid system which extend across the surface of the earth are covered with a surface treatment or mulch 40 so as to be concealed from sight and protected from damage. Any desired thickness of mulch can be employed since the fluid conduit is of small diameter and very flexible.

As can be visualized upon reference to FIG. 3, the entire irrigation system, composed of a plurality of the irrigation apparatuses 10 and their respective fluid conduits 201, is installed so as to extend throughout the landscaped area to be irrigated without the formation of any trenches or, necessarily, any boreholes for the individual irrigation apparatuses themselves. Nonetheless, when the fluid system is pressurized or, in other words, when manually, or under control of a timer, the fluid manifold, not shown, is operated to pressurize the system, the microirrigation sprinklers 190 all move from their retracted attitudes 210 to their deployed attitudes 211. In the deployed attitudes the microirrigation sprinklers 190 are above any surrounding plants including the plant 30. Accordingly, water under pressure is released through the discharge orifices 193 of the microirrigation sprinklers for the full range for which the microirrigation sprinklers are designed. Each microirrigation sprinkler can, in accordance with the design layout of the system, irrigate one or a plurality of the plants 30 in the adjacent area from the deployed attitude 211. Yet, when the irrigation system is deactivated, each irrigation apparatus is fully concealed within its respective plant.

As the plants 30 grow within the landscaped area irrigated by the irrigation apparatuses 10 comprising the irrigation system, the individual irrigation apparatuses can readily be adjusted to accommodate the growth in the plants so that, in the deployed attitude 211, the microirrigation sprinkler is always above the upper surface of the foliage of its respective plant. This is achieved by simply pulling the irrigation apparatus upwardly along the axis of reference 70 until the deployed attitude 211 of the microirrigation sprinkler 190 is again above the upper surface of the foliage. While the blades 87 resist such upward movement, such adjustment is usually readily achieved. If the soil has become so compacted that this is difficult, the soil need only be excavated about the irrigation apparatus to permit repositioning of the irrigation apparatus at the desired elevation and then recompacted thereabout to mount it in the selected position. The fluid conduit 201 thereof need not in any way itself be moved since upward movement of the irrigation apparatus achieves this purpose.

The irrigation system can similarly be adjusted to accommodate changes in the landscaping of the area, additional water needs for the plants making up the landscaped area and otherwise adjusting to the irrigation needs of the landscaped area. This is accomplished simply by adding additional fluid conduits 201 to extend from the source of water under pressure to the desired areas and installing irrigation apparatuses in the desired locations in the manner heretofore described. The fluid conduits 201 thereof are concealed using mulch 40 in the manner already described. Similarly, one or more of the irrigation apparatuses 10 and their respective fluid conduits 201 can be removed from the system by reversal of this process as desired. All such operations are achieved without formation of a single trench or, necessarily, any borehole for installation of the irrigation apparatuses involved.

Referring more particularly to FIGS. 3, 5 and 6, when a specific irrigation apparatus 10 is pressurized, the riser assembly 140 and the microirrigation sprinkler 190 thereof move from the retracted attitude 210 shown in full lines in FIG. 3 to the deployed attitude 211 shown in phantom lines in the same view. This is achieved by pressurization of the passage 65 of the base member 60 and the portion of the internal passage 104 of the main body member 100 beneath the sealing assembly 160, as shown in FIG. 6. While water under pressure is passing upwardly through the fluid passage 144 of the riser assembly to the microirrigation sprinkler, the pressure deferential resulting from the different diameters of the passages cause the pressure below the sealing assembly 60 to be greater than the overriding pressure of the compression spring 180. Thus, fluid pressure moves the riser assembly 140 with the sealing assembly 160 and microirrigation sprinkler 190 upwardly against compression of the compression spring 180 and thus to the deployed attitude 211. When the irrigation system is deactivated by shutting off the control valve of the valve manifold, not shown, fluid pressure within the internal passage 104 of the main body member 100 is dissipated to reduced fluid pressure below that applied by the compression spring 180. Thus, the compression spring 180, in combination with gravity, return the riser assembly 140 and the microirrigation sprinkler 190 from the deployed attitude to the retracted attitude.

Finally, the irrigation apparatus 10 of the present invention is adapted for usage in virtually all locations in which irrigation is required within a landscaped area. This includes flower beds, as well as lawn areas. Where employed in lawn areas, the irrigation apparatuses are installed precisely in the manner described, but prior to planting of the lawn. Thus, the area in which the lawn is to be planted is prepared for such planting and the irrigation apparatuses are positioned in the designed locations around the perimeter of the lawn area, where heads having half (½) or quarter (¼) spray patterns are used, and in the center areas, where heads having three hundred sixty degree (360°) spray patterns are used. The irrigation apparatuses are positioned as described with their sprinkler heads disposed at a level which accommodates the lawn when subsequently planted. Such planting can be by seed or stolons. In such cases, the fluid conduit comprising the irrigation system is simply laid over the prepared surface 21 of the earth 20 to extend to the source of fluid under pressure. Thereafter, a growing medium, such as mulch or the like is extended in a layer over the fluid conduit and throughout the lawn area. The covering layer is then leveled and the lawn seed or stolons planted thereon for growth of the lawn in the conventional fashion. It is also possible, using conventional procedures, for a growing medium containing the lawn seed, stolons, or the like, to be sprayed over the system of fluid conduits and within the lawn area in accordance. Alternatively, if desired, the lawn can be rolled on in pregrown strips. The strips are extended over the fluid conduit so as to conceal the fluid conduit and protect it from damage by usage of the lawn area, or during mowing. The strips grow into the growing medium and about the fluid conduit to form the lawn. In all such instances, operation of the irrigation apparatuses is precisely the same as previously described.

In all instances of installation, whether in flower beds, planters, lawn areas, or any other installations, the microirrigation sprinkler in the advanced position 211 is above the plant life to be watered. Thus, the range and pattern of fluid release are unobstructed and meet the design parameters therefor. The water is used most effectively and in accordance with the principals of water conservation. Furthermore, plants, such as ferns, requiring topical spray receive the full benefit of water application thereto.

Therefore, the method and apparatus for deploying a work object of the present invention are particularly well suited to usage in the installation and operation of such utility systems as subsurface electrical systems, sprinkler systems and other irrigation systems; permit such utility systems to be installed rapidly, dependably, and at a cost significantly below that which is heretofore been possible; can readily be modified or otherwise adjusted with little or no difficulty particularly when compared with conventional methods and apparatuses; require significantly less labor in the installation process than has heretofore been possible; once installed, is essentially invisible when not in operation; upon operation, is deployed in the optimum operational position for accomplishment of its operational objectives; can readily be adjusted to accommodate growth in plant life over a long operational life; and are otherwise entirely successful in accomplishing their operational objectives.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for deploying an irrigation nozzle, the apparatus comprising an elongated tubular housing constructed of conventional plastic irrigation tubing of sufficient rigidity to retain a substantially straight configuration, said housing having an internal fluid chamber and predetermined upper and lower end portions; a guide member mounted on the upper end portion of the housing having a passage extending therethrough interconnecting said internal fluid chamber of the housing with the exterior thereof; an elongated tubular member, having predetermined upper and lower end portions and a fluid passage extending therethrough extending between and outwardly through the upper and lower end portions of the tubular member, mounted in said passage of the guide member for slidable movement therewithin with the lower end portion of the tubular member within the internal fluid chamber of the housing and the upper end portion of the tubular member externally of the housing; means borne by the upper end portion of the tubular member for mounting said nozzle in fluid communication with said fluid passage of the tubular member; means for limiting said slidable movement of the tubular member between a retracted position, with said tubular member substantially received within the internal fluid chamber of the housing with the nozzle disposed externally of the housing, and an advanced position, in which the tubular member is disposed substantially externally of the housing and the nozzle is in a predetermined operational position remote from the housing; a spring adapted resiliently to retain the tubular member in the retracted position; and a coupling mounted on the lower end portion of the housing in fluid communication with the internal chamber of the housing and adapted to be connected to a fluid conduit for connection to a source of water under pressure whereby water under pressure can be delivered from said source, along said conduit, through the coupling and into the internal fluid chamber of the housing to pressurize said internal fluid chamber below the tubular member to move the tubular member to the advanced position and, thereby, the nozzle to said operational position.

2. The apparatus of claim 1 including a fluid seal mounted on the lower end portion of the tubular member in engagement with the housing substantially to seal said internal fluid chamber thereabove from the water under pressure received in the internal fluid chamber therebelow so as to impel the tubular member from the retracted position to the advanced position and to direct said water under pressure into the fluid passage of the tubular member.

3. The apparatus of claim 1 wherein the nozzle is adapted to irrigate one or more plants, each of which has a trunk bearing foliage, and the length of the tubular member, housing and operation of said limiting means cooperate to cause the distance of said slidable movement between said retracted and advanced positions to be such that said housing can be substantially buried in the earth in an installed position adjacent to the trunk of a plant and beneath the foliage thereof so that the nozzle is substantially fully concealed by the foliage of the plant, when the tubular member is in said retracted position, and the nozzle is substantially fully exposed above the foliage of the plant, when the tubular member is in said advanced position with the nozzle in said operational position.

4. The apparatus of claim 3 including at least one blade mounted on the lower end portion of the housing substantially aligned with a longitudinal axis of the housing operable to assist in burying the housing in the earth in said installed position.

5. The apparatus of claim, 4 wherein said blade is tapered toward a point substantially coincident with the longitudinal axis of the housing so that the housing can more easily be forced downwardly into the earth and to said installed position.

6. The apparatus of claim 5 wherein said blade has a trailing edge which is disposed at an angle to resist removal of the housing from said installed position.

7. The apparatus of claim 6 wherein three of said blades are mounted on the lower end portion of the housing so as substantially to define planes substantially intersecting with the longitudinal axis of the housing and having sharpened edges substantially facing in a direction away from the housing and blunt trailing edges substantially facing in a direction toward said housing.

8. The apparatus of claim 5 wherein said coupling extends laterally of the lower end portion of the housing for the receipt of a fluid conduit thereon and the coupling is disposed at an acute angle to said longitudinal axis of the housing and in a direction away from the lower end portion of the housing so as to minimize resistance therefrom in moving the housing to said installed position.

9. The apparatus of claim 8 including a blade mounted on said coupling substantially defining a plane substantially aligned with the longitudinal axis of the housing and tapered toward said point.

\* \* \* \* \*